United States Patent
Bergman et al.

(10) Patent No.: US 7,578,144 B2
(45) Date of Patent: Aug. 25, 2009

(54) METHOD FOR MINIMIZING REFRACTORY METAL INCLUSIONS IN A GLASS STIRRING OPERATION

(75) Inventors: Richard Bergman, Horseheads, NY (US); May Yanmei Xun, Elmira, NY (US)

(73) Assignee: Corning Incorporated, Corning, NY (US)

(*) Notice: Subject to any disclaimer, the term of this patent is extended or adjusted under 35 U.S.C. 154(b) by 474 days.

(21) Appl. No.: 11/485,793

(22) Filed: Jul. 13, 2006

(65) Prior Publication Data
US 2008/0011016 A1   Jan. 17, 2008

(51) Int. Cl.
*C03B 5/18* (2006.01)
*C03B 5/187* (2006.01)
(52) U.S. Cl. ............ 65/135.3; 65/29.1; 65/29.11; 65/29.12; 65/162; 65/163
(58) Field of Classification Search ..... 65/135.1–135.2, 65/135.3
See application file for complete search history.

(56) References Cited

U.S. PATENT DOCUMENTS

| 7,127,919 B2 * | 10/2006 | Goller et al. | 65/135.3 |
| 2003/0101750 A1 * | 6/2003 | Goller et al. | 65/135.3 |

FOREIGN PATENT DOCUMENTS

WO   WO2005/063633 A1   7/2005

OTHER PUBLICATIONS

"Development and Use of Mechanical Stirring in Corning Glass Works" Ashok L. Nayak, et al, Ceramic Engineering and Science Proceedings, Columbus, US vol. 7, No. 3/4, 1986, pp. 426-438.

* cited by examiner

*Primary Examiner*—Carlos Lopez
*Assistant Examiner*—Jodi Cohen
(74) *Attorney, Agent, or Firm*—Kevin M. Able (57) ABSTRACT

A method of a stirring a molten glass which includes an analytical model which may be used to optimize the stirring conditions to minimize refractory metal inclusions which may result from the stirring operation.

12 Claims, 4 Drawing Sheets

METHOD FOR MINIMIZING REFRACTORY METAL INCLUSIONS IN A GLASS STIRRING OPERATION

BACKGROUND OF THE INVENTION

1. Field of the Invention

This invention is directed to a method of homogenizing a molten glass, and in particular, a method for minimizing refractory metal inclusions incurred in a glass stirring operation.

2. Technical Background

Chemical and thermal homogeneity in glass is a crucial part of good glass forming operations. The function of a glass melter is generally to produce glass with acceptable levels of gaseous or solid inclusions, but this glass nevertheless usually has cord (or striae or ream) of chemically dissimilar phases. These non-homogeneous components of the parent glass result from a variety of normal occurrences during the melting process including refractory dissolution, melting stratification, glass surface volatilization, and temperature differences. The resulting cords are visible in the parent glass because of color and/or refractive index differences.

One approach for improving the homogeneity of glass is to pass the molten glass through a stir chamber located downstream of the melter. Such stir chambers are equipped with a stirrer having a central shaft which is rotated by a suitable motor. A plurality of blades extend from the shaft and serve to mix the molten glass as it passes from the top to the bottom of the stir chamber. To resist the high temperatures and corrosive attributes of the glass chemistry, the stirrer and the stir chamber are typically fabricated from a refractory metal, often a platinum group metal—ruthenium, rhodium, palladium, osmium, iridium, and platinum, or alloys thereof, but may be other high temperature, corrosion-resistant metals such as molybdenum. The present invention is concerned with the operation of such stir chambers without introducing inclusion defects into the resulting glass, specifically, defects arising from erosion of the stir chamber wall and/or the surfaces of the stirrer as a result of the mixing process.

A simple way of picturing what a stirrer does under laminar flow conditions is to think of the cord as lumps of off-composition glass surrounded by glass of desired, or-parent, composition. Each piece of cord can be thought of as having an interface between it and the parent glass. A measure of the total inhomogeneity of the glass is the total interfacial surface area of the cord. The minimum interfacial surface area occurs when all of the cord is in one spherical lump. As the lumps are broken into smaller parts and are stretched out into flat planes, the interfacial surface area is increased despite the fact that the volume of cord remains the same. A measure of the efficiency of stirring (also referred to herein as the effectiveness of stirring) is the ratio of the increased interfacial area after stirring to that before stirring.

To be effective in increasing homogeneity, a stirring system should perform the following three functions:

(1) It should stretch the individual lumps of in homogeneous glass into thin streaks. This function requires the application of shear stress to the glass.
(2) It should cut the streaks into short segments. This function can be achieved through flow of the molten glass in a direction normal to the plane of the stirrer's blades.
(3) It should disperse the short segments such that there is no recognizable pattern. This function can be achieved through the selection of blade shapes that push glass normal to the direction of bulk flow, i.e., blade shapes that produce at least some radial flow of the glass.

Making the streaks thin and cutting them makes them individually difficult to see on a microscopic scale. Dispersing them eliminates the possibility that a visible pattern will be left on a macroscopic scale.

In a process where the flow of glass is continuous, these three functions must take place in a discrete time interval determined by the residence time of the molten glass in the stir chamber. As the flow rate of glass is increased to meet growing production needs, the glass has less time in the chamber for these three functions to take place. The usual engineering response to a desired increase in flow is an increase in stirrer speed. This increases the shear stress, the cutting frequency, and potentially also the dispersion rate.

Traditionally, glass stirring systems have been designed to have the highest shear stress possible consistent with reasonable stirrer life. Indeed, such systems are normally designed to produce high shear stress even when operated at low speeds. The intent is to get the most-stirring from the smallest stirring system because of the high cost of the refractory metals (e.g., platinum group metals and alloys thereof) typically used in the fabrication of the stirring system. In general terms, shear stress may be increased by increasing blade speed, reducing the clearance (coupling) between the stirrer's blades and the wall of the stir chamber, reducing the temperature of the glass, or a combination of these actions.

For many glass products (e.g., architectural glass), only moderate homogeneity requirements apply. However, other glass products must meet stringent homogeneity and other quality standards. Glass used in the manufacture of visual displays, such as liquid crystal displays (LCDs) is in this latter category. For glass used in the manufacture of displays, both cord and inclusions need to be minimized and/or eliminated.

It was discovered that, in the process of making LCD glass, refractory metal inclusions having a size less than 50 microns were being introduced into the LCD glass during its manufacture. These inclusions were traced to the stir chamber and, in particular, to erosion of the stirrer and the stir chamber wall as a result of viscous shear stresses created by the motion of the stirrer through the viscous molten glass. The present invention provides a method to reduce or eliminate refractory metal inclusions in the stirred glass.

SUMMARY

The invention will be understood more easily and other objects, characteristics, details and advantages thereof will become more clearly apparent in the course of the following explanatory description, which is given, without in any way implying a limitation, with reference to the attached Figures. It is intended that all such additional systems, methods features and advantages be included within this description, be within the scope of the present invention, and be protected by the accompanying claims.

In accordance with an embodiment of the present invention, a method for homogenizing molten glass is presented comprising, operating a stir chamber, the stir chamber including a rotating stirrer, the stir chamber and the stirrer including a refractory metal, rotating the stirrer at a plurality of different speeds $N_i$ as the molten glass flows through the stir chamber, where i indicates the number of speeds N and flowing molten glass through the stir chamber at a plurality of different glass temperatures $T_j$, where j indicates the number of temperatures T. An actual refractory metal inclusion rate in the molten glass is determined for combinations of $N_i$ and $T_j$, and a distribution of shear stress as a function of stir chamber and stirrer surface areas in contact with the molten glass is determined for the combinations of $N_i$ and $T_j$. A threshold value of shear stress $\sigma_0$ for each $T_j$ is calculated, as well as a refractory metal inclusion rate temperature dependence $m_t$. From the above data a predicted refractory metal inclusion rate for a predetermined temperature and stirrer rotational speed can be calculated, and modifications to the stir chamber operation made in response to the predicted refractory metal inclusion rate to minimize refractory metal inclusions in the molten glass.

Preferably, $N_t$ is between about 0 rpm and 100 rpm, more preferably between about 8 rpm and 18 rpm. $T_j$ is preferably between about 1200° C. and 1600° C., more preferably between about 1430° C. and 1490° C. Preferably, $m_t$ is between about 0 (zero) $m^{-2}Pa^{-1}sec^{-1}$ and 1 (one) $m^{-2}Pa^{-1}sec^{-1}$ in the temperature range between about 1200° C. and 1600° C. The threshold shear stress $\sigma_0$ may vary anywhere between about 1000 Pa and 10,000 Pa over the temperature range of 1200° C. to 1600° C.

DETAILED DESCRIPTION

In the following detailed description, for purposes of explanation and not limitation, example embodiments disclosing specific details are set forth to provide a thorough understanding of the present invention. However, it will be apparent to one having ordinary skill in the art, having had the benefit of the present disclosure, that the present invention may be practiced in other embodiments that depart from the specific details disclosed herein. Moreover, descriptions of well-known devices, methods and materials may be omitted so as not to obscure the description of the present invention. Finally, wherever applicable, like reference numerals refer to like elements.

Figure 1:
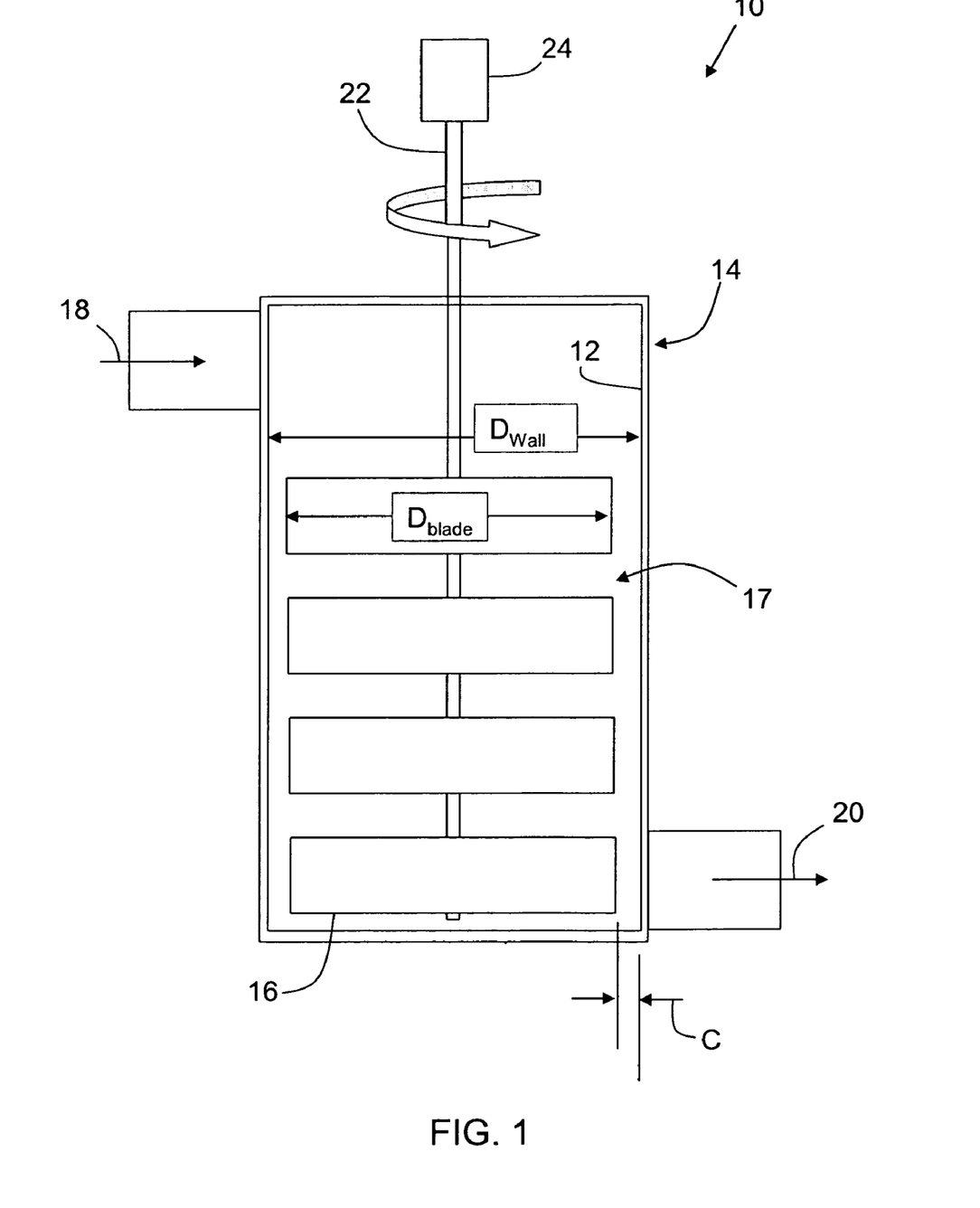
FIG. 1 is a side elevation, cross sectional view of an exemplary stirring system, including a stir chamber and a stirrer rotatably mounted within the stir chamber.

Prior to the present invention, the philosophy underlying stirrer/stir chamber design was to generate high levels of shear stress to achieve high levels of stirring effectiveness, E. Referencing FIG. 1 illustrating an exemplary stirring system 10, shear stress is created near the inside wall surface 12 of a stir chamber 14 by close clearance between the stirrer blades 16 of stirrer 17 and the wall (coupling) and by the rotational speed of the blades. In FIG. 1, arrow 18 represents molten glass entering stir chamber 14 and arrow 20 represents molten glass leaving stir chamber 14. Blades 16 are attached to stirrer shaft 22, which is rotated at a predetermined rotational speed by motor 24. In general terms, the shear stress a acting on the surfaces of the stirrer and the inner surface of the stir chamber wall can be expressed as:

$$|\sigma|=\mu dv/dx \qquad (1)$$

where $\mu$ is the viscosity of the molten glass, v is fluid velocity, and x is in a direction normal to the surface which experiences the shear stress.

Applying equation (1) to a cylindrically-shaped stir chamber and a circularly symmetric stirrer having one or more blades of a common diameter $D_{blade}$, for example, one obtains:

$$|\sigma|=\mu\pi ND_{blade}/C \qquad (2)$$

where N is the stirrer speed in radians/second and C is the coupling distance between the blade tip and the stir chamber wall (i.e., in FIG. 1, $C=(D_{wall}-D_{blade})/2$). For $\mu$ in kilograms/meter-second, N in radians/second, and $D_{blade}$ and C in meters, $\tau$ is in newtons/meters squared ($N/m^2$).

Through modeling of oil-flow based systems, stirring effectiveness E has been determined to be:

$$E \approx (kBD_{blade}^2 NV|\tau|/Q^2\mu)^{0.5} \qquad (3)$$

where k is a constant which depends on stirrer/stir chamber geometry, Q is flow rate, B is the number of blade tips, and V is the swept volume of the stirrer. The stirring effectiveness quantity E can be thought of as the ratio of cord level entering the stirring process to the cord level exiting the process, i.e., higher values of E represent less cord at the end of the stirring process. A more complete discussion of stirring effectiveness is presented, for example, in U.S. Patent No. 2003/0101750, filed on Nov. 22, 2002, the content of which is incorporated herein by reference.

In accordance with the present invention, an analytical model has been developed which may be applied to determine stirring operation conditions which minimize erosion of the stirrer and the stirrer chamber wall that can produce unacceptably high levels of refractory metal inclusions (e.g., levels of inclusions which are greater than, for example, 20 per kilogram of finished glass) that are of a size greater than a pre-determined size (e.g., inclusions having a size greater than 10 microns). Beneficially, minimization of this erosion can extend the service life of the stirring system, thereby reducing frequent and expensive rebuilding of the system.

From equation (2), it can be seen that shear stress can be reduced by reducing N and/or reducing $D_{blade}$ and/or increasing C. Intuitively, high shear stress should induce greater erosion of the stirrer and stir chamber surfaces, and hence more refractory metal inclusions in the glass. However, simply reducing shear stress to reduce refractory metal inclusions below a specified value is not always, in and of itself, a commercially viable practice, since in the end, stirring must still produce suitably homogenized glass at practical flow rates. For a practical stirring operation, reductions in shear stress should not be at the expense of stirring effectiveness or flow rate. Thus, a method of optimizing stirring process parameters that does not sacrifice stirring effectiveness or flow rate is highly desirable.

From FIG. 1 and the preceding equations it should be apparent that shear stress is, in part, a function of location on the surfaces of the stirring system. That is, not all surfaces experience the same shear stress for a given set of operating conditions, and therefore not all surfaces of the stirrer and stir chamber are responsible for the same level of refractory metal inclusions. Accordingly, a method of correlating a refractory metal inclusion rate to the distribution of shear stress developed by the motion of the stirrer (and the stirrer blades) through the molten glass is presented. The method brings together the material properties of the refractory metal, and the composition of the glass being stirred, which may be expressed with the aid of two experimentally determined parameters: the coefficient of temperature dependence of refractory metal inclusions and the shear stress threshold. Practicing the present invention makes it possible to predict the inclusion rate for a given stir system design under a variety of process conditions. As used herein, the term "stirring system" shall be interpreted to mean the stirrer (e.g. shaft and blades), stir chamber, and associated components (inlet pipe, outlet pipe, motor for rotating the stirrer shaft, etc.) directly related to the stirring operation.

Figure 2:
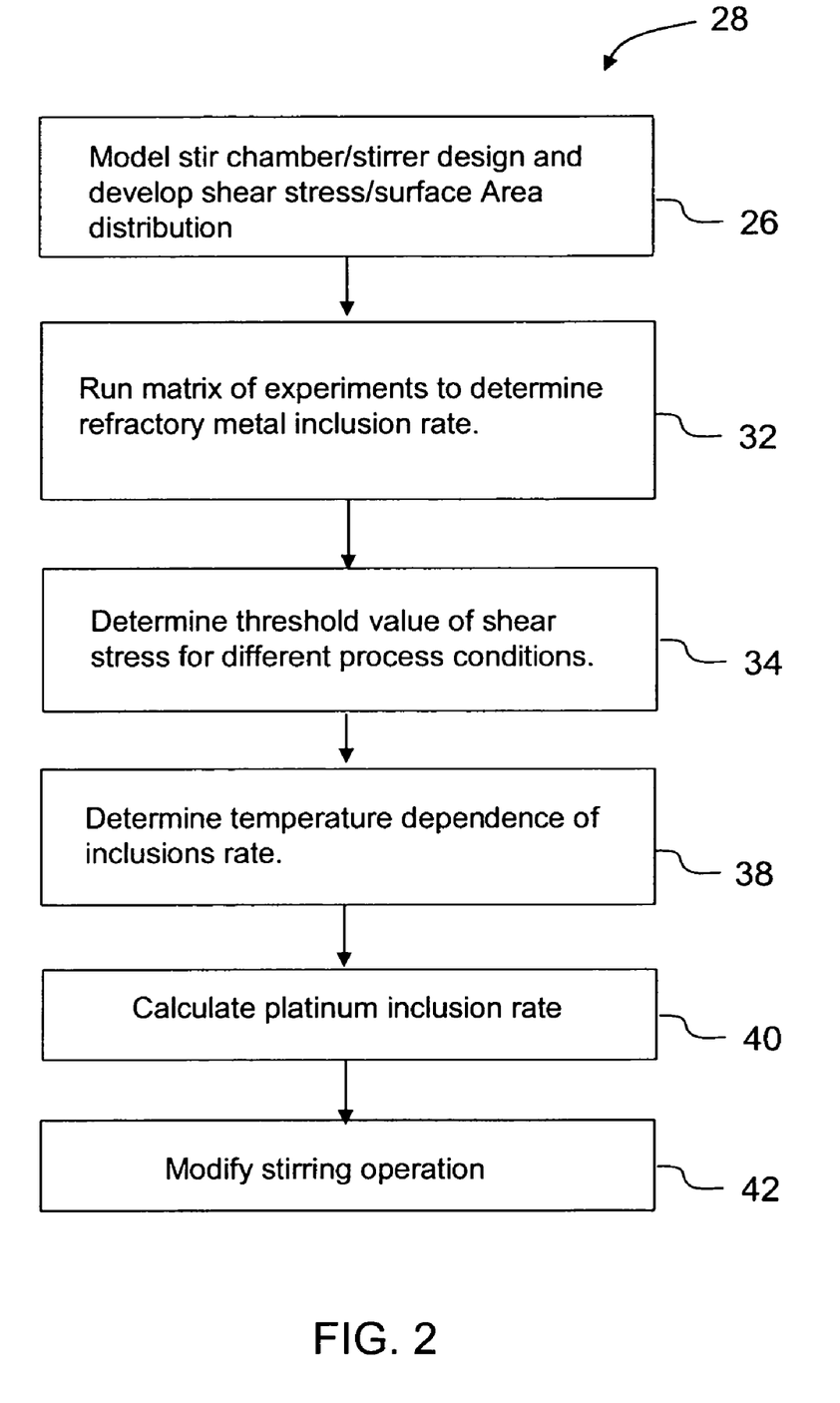
FIG. 2 is a diagrammatic representation of an embodiment of the inventive method.

As illustrated in FIG. 2, step 26 of method 28 comprises calculating a shear stress vs. surface area distribution for multiple operating conditions and a given stirrer/stir chamber design. This may be accomplished by utilizing commercially available software to perform computational fluid dynamic (CFD) calculations using a suitable computing device (for example, a desktop computer). In a CFD approach, the stir chamber and stirrer are reduced to a virtual mesh configuration within the software that describes the stirrer arrangement, the stir chamber geometry, etc. The appropriate stir system operating conditions such as stirrer rotational speed and glass temperature/viscosity are also input to the software program. Output of the software can be configured to produce a plot of the shear stress on the refractory metal surfaces of the chamber and stirrer as a function of surface area in contact with the glass. An exemplary shear stress vs. surface area distribution representing the refractory metal surface area under the influence of a particular level of shear stress is shown by curve 30 in FIG. 3.

It has been found that the highest values of shear stress acting on the stirrer blades generally occur at the tips of the blades, i.e. that portion of a blade in closest proximity to inside wall surface 12 of stir chamber 14. The tips of the stirrer blades represent only a small surface area relative to the total surface area in contact with the molten glass. Thus, these small surface area, high stress, defect-producing portions of the stirrer blades are represented by the region to the right hand side of the stress vs. surface area distribution of FIG. 3. On-the other hand, the remainder of the blade and-stir chamber walls, representing the majority of the surface area, experience only very small amounts of shear stress, and is represented by the left hand portion of the distribution.

In step 32 of method 28, a series, or matrix, of designed experiments are performed to determine an actual refractory metal inclusion rate for at least several different stirrer rotation speeds and several different temperatures. A minimum of four experiments should be run, covering two different temperatures and two different stirrer rotation speeds. Additional experiments at additional temperatures and rotation speeds may be conducted as necessary or desired. In step 32 the same stir chamber/stirrer design is used for each experiment, as well as the same glass composition. The number of refractory metal inclusions in glass drawn (removed) from the stir system may then be counted as a function of the weight of the drawn glass in order to determine a refractory metal inclusion rate. Counting of the refractory metal inclusions is a straight forward task. For example, the number of refractory metal inclusions per unit weight of glass may be determined by shining a light through a sample of the glass which has been removed from the stir chamber to illuminate the inclusions, and counting the refractory metal inclusions through a microscope. Knowing the flow rate of the glass through the stirring system allows one to describe the refractory metal inclusion rate r in terms of inclusions per unit weight, or as a function of time.

An exemplary matrix of the inclusion-producing experiments is shown in Table 1 below, where $T_1$ and $T_2$ represent two different temperatures, $N_1$ and $N_2$ represent two different stirrer rotational speeds, and $r_{11}$, $r_{12}$, $r_{21}$ and $r_{22}$ represent the four resulting refractory metal inclusion rates. It is not necessary to restrict the matrix experiments to a 2×2 set of experiments. Additional experiments may be run as desired, and Table 1 reflects a broader set of experiments, where $N_i$ represents the $i^{th}$ stirrer rotational speed and $T_j$ represents the $j^{th}$ glass temperature, while $r_{ij}$ represents the refractory metal inclusion rate for the $i^{th}$ stirrer rotation rate and the $j^{th}$ glass temperature. Obviously, the values of i and j depend upon the size of the matrix experiment which is run and simply designate the number of stirrer speeds and glass temperatures. For example, in an p-by-q matrix, i would have a value which is a whole number between 2 and p, while j would have a value which is a whole number between 2 and q. Additionally, it is not necessary that the added temperatures or rotational speeds be added symmetrically. That is, the matrix need not be symmetric. Therefore, one might use, for example, three temperatures and two rotational speeds.

TABLE 1

|   | $T_1$ | $T_2$ | $T_j$ |
|---|---|---|---|
| $N_1$ | $r_{11}$ | $r_{12}$ | $r_{1i}$ |
| $N_2$ | $r_{21}$ | $r_{22}$ | $r_{2i}$ |
| $N_i$ | $r_{i1}$ | $r_{i2}$ | $r_{ij}$ |

Step 34 of method 28 comprises determining the threshold value of shear stress that causes refractory metal inclusions above a predetermined rate. A model of refractory metal inclusions can be described by the equation:

$$r = \int m_r A(\sigma - \sigma_0) \quad (4)$$

where:
  r is the rate that refractory metal inclusions enter the glass in inclusions/sec$^{-1}$;
  $m_r$ is a temperature-dependent constant representing the ease with which refractory metal-to-refractory metal bonds may be broken, in units of m$^{-2}$Pa$^{-1}$sec$^{-1}$;
  σ is the shear stress applied at the stir chamber inside wall and on the stirrer blades, in Pascals (Pa); and
  A is the area under the applied shear stress σ in m$^2$;
  $\sigma_0$ is a threshold shear stress in Pascals (Pa).

In equation (1), r may be any one of the r values determined from the matrix experiment presented in Table 1, i.e. $r_{11}$, $r_{12} \ldots r_{ij}$.

As described, the parameter $m_r$ in equation (4) represents the contribution of the material properties of the refractory metal, and is dependent upon the strength of the refractory metal-to-refractory metal molecular bonds. The weaker the refractory metal, the larger the value of $m_r$. The $m_r$ parameter is also a function of the glass properties: the more reactive the glass is with the refractory metal, the larger the value of $m_r$. These dependencies may be expressed by equation (5) below:

$$m_r = m_0 \exp(-m_1/T) \quad (5)$$

where $m_1$ represents the effect of refractory metal weakening as a result of an increase in temperature, and $m_0$ represents the interaction between the glass and the refractory metal for both the stir chamber and the stirrer. T is the absolute temperature of the refractory metal in contact with the molten glass.

For a specific refractory metal and glass composition, $m_0$ and $m_1$ can be determined experimentally by measuring the refractory metal inclusion rate at several temperature points, while keeping other process conditions, such as the stirrer rotational speed N, constant. In other words, glass can be processed through the stir chamber, and the number of refractory metal inclusions in the formed glass may be counted as a function of the mass (i.e. weight) of glass at a plurality of different temperatures.

To calculate the threshold shear stress $\sigma_0$, $m_t$ is assumed to be a function of temperature only, and therefore independent of stirrer rotational speed. The threshold shear stress may be viewed as the shear stress below which, at a given temperature, the refractory metal inclusion rate is insignificant. Equation (4) can then be used to determine the threshold shear stress $\sigma_0$. That is, equation (4) may be set equal to itself, through $m_t$, for the two different stirrer rotational speeds $N_1$ and $N_2$, but a single temperature, for example $T_1$:

$$r_{11} \Big/ \int_{\sigma_0}^{\sigma_{max}} \Big( A_1(\sigma - \sigma_0) d\sigma = r_{21} \Big/ \int_{\sigma_0}^{\sigma_{max}} (A_2(\sigma - \sigma_0) d\sigma \quad (6)$$

Since the refractory metal inclusion rates $r_{11}$ and $r_{21}$ (denoting stirrer speeds 1 and 2 at temperature $T_1$) are known through the experimental data determined at step 32, and A as a function of shear stress $\sigma$ is determined through the CFD software (derived from the shear stress vs. surface area distribution produced in step 26), equation (6) may be solved for $\sigma_o$ at the given temperature.

Computationally, equation (4), as indicated by equation 6 above, is properly an integration representing the area under each distribution curve between the shear stress for the onset of refractory metal inclusions, $\sigma_0$, and the maximum shear stress experienced by the system under the given conditions, $\sigma_{max}$ (where $\sigma_0 < \sigma_{max}$):

$$r = \int_{\sigma_0}^{\sigma_{max}} m_t A(\sigma - \sigma_0) d\sigma \quad (7)$$

Figure 3:
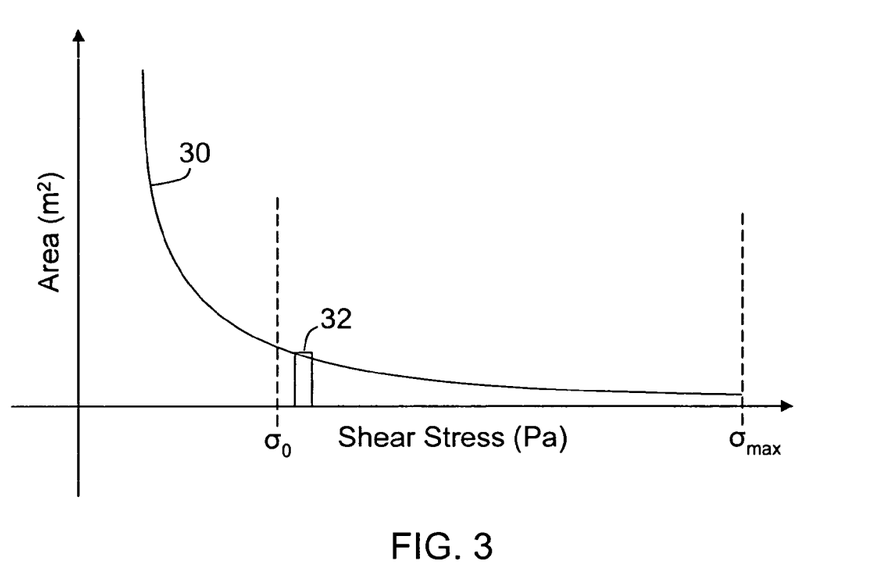
FIG. 3 is an exemplary plot of the distribution of shear stress vs. surface area of the stirrer and stir chamber exposed to the molten glass.

Practically, the integral may be evaluated discretely by reducing each distribution of stress vs. surface area to small vertical slices (of which only one exemplary slice, slice 32, is shown in FIG. 3) and summing the slices without an undue introduction of error into the calculation. This can significantly simplify the calculation. Equation (6) may then be solved for the second predetermined temperature $T_2$ and the two different stirrer rotational speeds $N_1$ and $N_2$, to calculate $\sigma_0$ value for a second temperature-stirrer speed combination.

Once $\sigma_0$ has been calculated for different stirrer speeds and temperatures, the temperature dependence of refractory metal inclusion $m_t$, as indicated in step 38 of method 28, may be determined. In this step, the experimental data at two different temperatures for a given stirrer rotational speed are utilized in equation (5), giving:

$$m_{t1} = m_0 \exp(-m_1/T_1) \quad (8)$$

$$m_{t2} = m_0 \exp(-m_1/T_2) \quad (9)$$

Equations (8) and (9), representing the two unknown values $m_0$ and $m_1$, may then be solved for $m_0$ and $m_1$, where $m_{t1}$ and $m_{t2}$ represent the temperature dependence of refractory metal inclusion at the two different temperatures $T_1$ and $T_2$, respectively. Knowing $m_0$ and $m_1$, an $m_t$ value for any temperature may thereafter be calculated. Once $m_t$ has been determined, equation (4) may be used to calculate a predicted refractory metal inclusion rate for any stir system fabricated using the same refractory metal and stirring the same glass composition, as shown in step 40 of method 28. That is, because $m_t$ and $\sigma_0$ are based on the material properties of the refractory metal and the glass, respectively, and therefore independent of stir system physical design, all that need be done to evaluate the performance of another stir system design using the same refractory metal and the same glass composition is to generate the stress vs. surface area distribution for the new design. The data may then be applied through equation (4) to determine the new performance.

Finally, as indicated by step 42 of method 28, once an optimal set of process conditions have been identified for a given stir system design, this information may be used to modify a particular stirring operation (by adjusting the stirrer rotational speed and/or the glass temperature) to minimize the number of refractory metal inclusions. For example, the refractory metal inclusion rate may be calculated for a variety of different process conditions and plotted to show the process conditions required to produce a minimum of refractory metal inclusions. Alternatively, other stir system designs may be evaluated by development of the CFD-generated stress vs. surface area distributions for the new stir system design, and using the resultant data to calculate a refractory metal inclusion rate for the new stir system under a variety of process conditions (stirrer rotational speeds and glass temperatures). Selection of the appropriate process conditions for a given stir system design, of course, should be made within the context of maintaining an appropriate level of stirring effectiveness with regard to glass homonogeneity. The following example serves to illustrate the foregoing process.

EXAMPLE

The following description summarizes an example of predicting the refractory metal inclusion rate for a given stir chamber/stirrer design and a single glass composition in accordance with the present invention.

Using Fluent CFD software, a shear stress vs. surface area distribution was developed under a variety of imposed flow conditions for a first stir chamber/stirrer design (stirring system design I) and Corning Incorporated code 1737 glass composition. Stirrer speeds were also varied, ranging through 8 rpm, 9 rpm, 10 rpm and 12 rpm.

Figure 4:
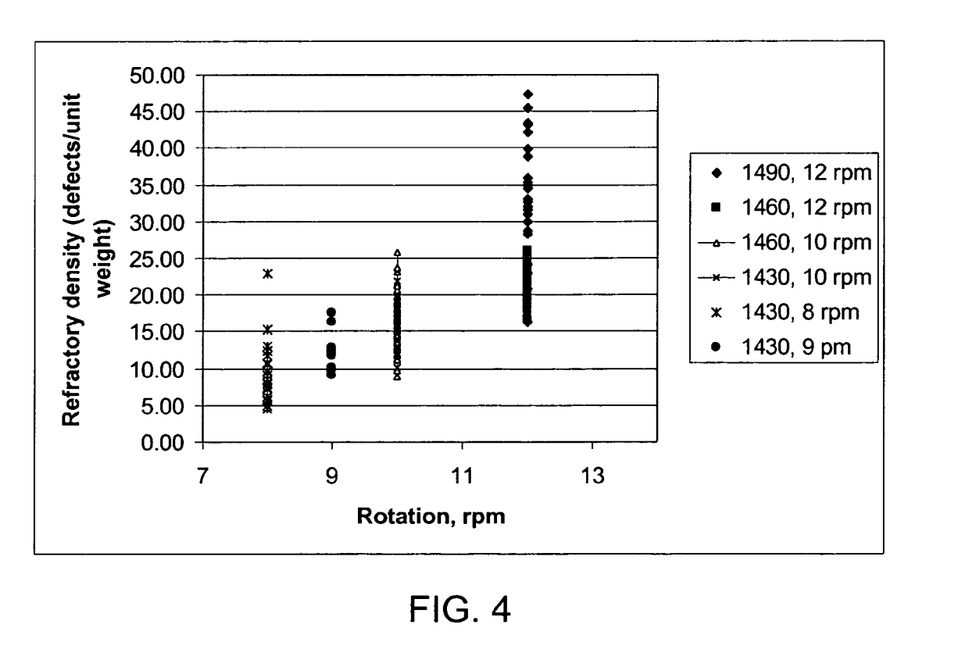
FIG. 4 is a plot of refractory metal inclusions counted within samples of glass drawn from a stir system.

Next, experiments were run on the real life stir chamber/stirrer, which was part of a conventional glass making process. Glass was flowed through the stir chamber at three temperatures (1430° C., 1460° C. and 1490° C.) and with stirrer rotational speeds of 8 rpm, 9 rpm, 10 rpm and 12 rpm. Glass which was homogenized in the stir chamber was drawn at the conclusion of the glass making process, and the number of refractory metal inclusions per unit weight (e.g. pounds of glass) was counted and recorded, along with the operating conditions under which the glass was drawn. A plot of the data is shown in FIG. 4, plotted as the number of inclusions per unit weight (i.e. refractory metal inclusion density) vs. the rotational speed of the stirrer for different temperatures. The refractory metal inclusion rate was then converted to refractory metal inclusions per unit time ($sec^{-1}$)

Using the above computations, (e.g. equations (5)-(9)) and the shear stress vs. surface area distributions, $\sigma_0$ was determined to be in the range of 3000-3200 Pa for both 1430° C. and 1460° C., and approximately 1420 Pa at 1490° C. The coefficient of temperature dependence of the refractory metal inclusion ranged from 0.18 $m^{-2}Pa^{-1}sec^{-1}$ to 0.65 $m^{-2}Pa^{-1}sec^{-1}$ over the temperature range of 1430° C. to 1490° C. These results are reflected in Table 2 below.

TABLE 2

|  | 1430° C. | 1460° C. | 1490° C. |
|---|---|---|---|
| $m_t$ (m$^{-2}$Pa$^{-1}$sec$^{-1}$) | 0.18 | 0.35 | 0.65 |
| $\sigma_0$ (Pa) | 3200 | 3000 | 1420 |

Figure 5:
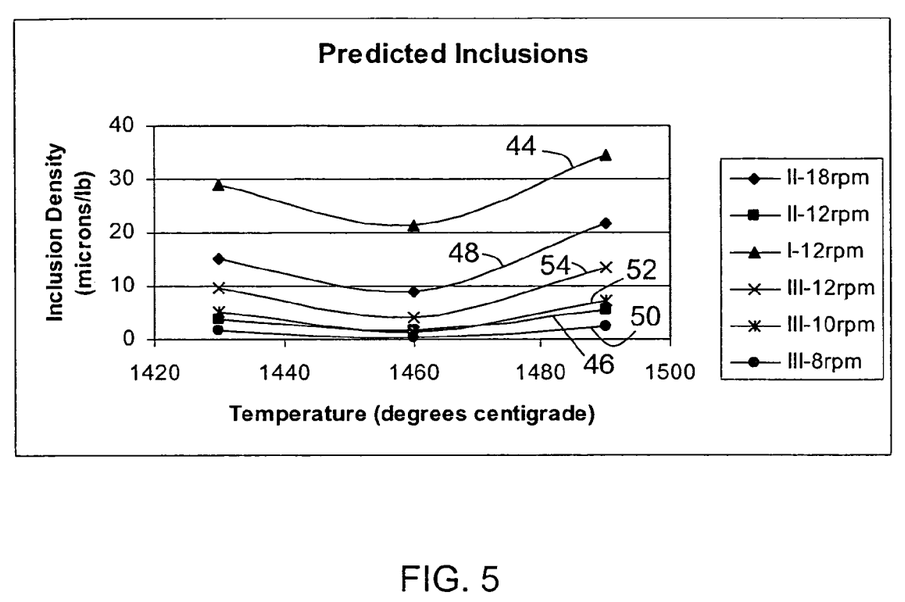
FIG. 5 is a plot depicting refractory metal inclusion performance of several stir systems under a variety of operating conditions.

Advantageously, as described above, the values of $m_t$ and $\sigma_0$ obtained by following the preceding method are largely independent of stir system physical design, for a given set of refractory metal and glass composition. That is, for a stirrer/stir chamber design different than the original modeled system, but which utilizes the same refractory metal and glass composition, the coefficient of temperature dependence of refractory metal inclusions and the shear stress threshold determined above may be used to predict the refractory metal inclusion rate for different stir system designs: one need only generate appropriate distribution plots from the flow dynamics to account for the contributions to refractory metal inclusions due to the physical design of the system (e.g. the coupling distance, blade tip areas, etc.). Put another way, for a given glass composition, and a stir system utilizing a given refractory metal, the values of $m_t$ and $\sigma_0$ determined above may be used to predict the refractory metal inclusion performance of the stir system regardless of the system's mechanical design. For example, the plot shown in FIG. 5 depicts six curves. Curve 44 illustrates the refractory metal inclusion performance of the stir system used to generate the data presented in Table 2 above when operated over a temperature range from 1430° C. to 1490° C. and a stirrer rotational speed of 12 rpm. On the other hand, curves 46-54 reflect the predicted performance of two additional stir systems having physical designs different than the first system but fabricated from the same refractory metal and using the same glass composition over the same range of temperatures.

As seen from FIG. 5, the family of curves 44-54 suggest an optimal (from the stand point of reduced refractory metal inclusion defects) operating glass temperature of about 1460° C. over a broad range of stirrer rotational speeds, from a low of 8 rpm (curve 50) to a high of 18 rpm (curve 48). Indeed, somewhat counterintuitively, the performance of stir system II, for example (curve 48), indicates a lower resultant refractory metal inclusion rate at 18 rpm than stir system I (curve 44) at 12 rpm (again, for the same glass composition and the same refractory metal). Subsequent comparison between these predictions and actual manufacturing operations has borne out the results implied by FIG. 5.

It should be emphasized that the above-described embodiments of the present invention, particularly any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A method for homogenizing molten glass comprising:
   operating a stir chamber, the stir chamber including a rotating stirrer, the stir chamber and the stirrer including a refractory metal;
   rotating the stirrer at a plurality of different speeds $N_i$ as the molten glass flows through the stir chamber, where i indicates the number of speeds N;
   flowing molten glass through the stir chamber at a plurality of different glass temperatures $T_j$, where j indicates the number of temperatures T;
   determining an actual refractory metal inclusion rate in the molten glass for combinations of $N_i$ and $T_j$;
   calculating a distribution of shear stress as a function of stir chamber and stirrer surface areas in contact with the molten glass for the combinations of $N_i$ and $T_j$;
   using the actual refractory metal inclusion rates and the distributions of shear stress to calculate a threshold value of shear stress $\sigma_0$ for each $T_j$;
   calculating a refractory metal inclusion rate temperature dependence $m_t$;
   using the refractory metal inclusion rate temperature dependence and the threshold value of shear stress to calculate a predicted refractory metal inclusion rate for a predetermined temperature and stiffer rotational speed; and
   varying the glass temperature and/or varying the stirrer rotation speed in response to the predicted refractory metal inclusion rate to minimize refractory metal inclusions in the molten glass.

2. The method according to claim 1 wherein a value of i is $\geq 2$.

3. The method according to claim 1 wherein a value of j is $\geq 2$.

4. The method according to claim 1 wherein $N_i$ is between about 0 rpm and 100 rpm.

5. The method according to claim 1 wherein $N_i$ is between about 8 rpm and 18 rpm.

6. The method according to claim 1 wherein $T_j$ is between about 1200° C. and 1600° C.

7. The method according to claim 1 wherein $T_j$ is between about 1430° C. and 1490° C.

8. The method according to claim 1 wherein the refractory metal is selected from the group consisting of ruthenium, rhodium, palladium, osmium, iridium, and platinum, or alloys thereof.

9. The method according to claim 1 wherein $m_t$ is between about 0 m$^{-2}$Pa$^{-1}$sec$^{-1}$ and 1 m$^{-2}$Pa$^{-1}$sec$^{-1}$ in the temperature range between about 1200° C. and 1600° C.

10. The method according to claim 1 wherein $m_t$ is between about 0.18 m$^{-2}$Pa$^{-1}$sec$^{-1}$ and 0.65 m$^{-2}$Pa$^{-1}$sec$^{-1}$ in the temperature range between about 1430° C. and 1490° C.

11. The method according to claim 1 wherein $\sigma_0$ is between about 10,000 Pa and 1000 Pa in the temperature range between about 1200° C. and 1600° C.

12. The method according to claim 1 wherein $\sigma_0$ is between about 3000 Pa and 1420 Pa in the temperature range between about 1430° C. and 1490° C.

* * * * *

UNITED STATES PATENT AND TRADEMARK OFFICE
CERTIFICATE OF CORRECTION

PATENT NO. : 7,578,144 B2　　　　　　　　　　　　　　　　　　Page 1 of 1
APPLICATION NO. : 11/485793
DATED : August 25, 2009
INVENTOR(S) : Richard Bergman et al.

It is certified that error appears in the above-identified patent and that said Letters Patent is hereby corrected as shown below:

| No. | Col. | Line | Description |
|---|---|---|---|
| 1 | 3 | 59 | After the word "stress" please delete "a" and add the symbol "σ" |
| 2 | 10 | 48 | Please delete "0 $m^{-2}Pa^{31\ 1}sec^{31\ 1}$ and 1 $m^{-2}Pa^{31\ 1}sec^{31\ 1}$" and add "0 $m^{-2}Pa^{-1}sec^{-1}$ and 1 $m^{-2}Pa^{-1}sec^{-1}$" |
| 3 | 10 | 51 | Please delete "0.18 $m^{31\ 2}Pa^{31\ 1}sec^{31\ 1}$ and 0.65 $m^{-2}Pa^{31\ 1}sec^{31\ 1}$" and add "0.18 $m^{-2}Pa^{-1}sec^{-1}$ and 0.65 $m^{-2}Pa^{-1}sec^{-1}$" |

Signed and Sealed this

Twenty-fourth Day of November, 2009

David J. Kappos
*Director of the United States Patent and Trademark Office*